United States Patent
Ananthanarayanan et al.

(10) Patent No.: US 8,561,126 B2
(45) Date of Patent: Oct. 15, 2013

(54) AUTOMATIC ENFORCEMENT OF OBLIGATIONS ACCORDING TO A DATA-HANDLING POLICY

(75) Inventors: Rema Ananthanarayanan, New Delhi (IN); Mukesh K Mohania, New Delhi (IN); Ajay Kumar Gupta, New Delhi (IN); Calvin Stacy Powers, Chapel Hill, NC (US); Sachindra Joshi, New Delhi (IN); Manish Anand Bhide, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1965 days.

(21) Appl. No.: 11/025,307

(22) Filed: Dec. 29, 2004

(65) Prior Publication Data

US 2006/0143464 A1     Jun. 29, 2006

(51) Int. Cl.
*G06F 17/00*     (2006.01)

(52) U.S. Cl.
USPC .................................. 726/1; 726/2; 713/182

(58) Field of Classification Search
USPC .................................. 713/182; 726/2, 26–33
See application file for complete search history.

(56) References Cited

U.S. PATENT DOCUMENTS

| | | | |
|---|---|---|---|
| 6,065,100 A * | 5/2000 | Schafer et al. | 711/137 |
| 6,237,786 B1 | 5/2001 | Ginter et al. | |
| 6,253,203 B1 | 6/2001 | O'Flaherty et al. | |
| 6,363,488 B1 | 3/2002 | Ginter et al. | |
| 6,647,388 B2 * | 11/2003 | Numao et al. | 1/1 |
| 6,697,948 B1 * | 2/2004 | Rabin et al. | 726/30 |
| 7,100,195 B1 * | 8/2006 | Underwood | 726/2 |
| 7,140,035 B1 * | 11/2006 | Karch | 726/1 |
| 7,627,753 B2 * | 12/2009 | Whitten et al. | 713/161 |
| 2001/0023421 A1 * | 9/2001 | Numao et al. | 707/9 |
| 2002/0075877 A1 * | 6/2002 | Tahan | 370/400 |
| 2002/0078199 A1 * | 6/2002 | Tahan | 709/225 |
| 2002/0091819 A1 * | 7/2002 | Melchione et al. | 709/224 |
| 2002/0104015 A1 * | 8/2002 | Barzilai et al. | 713/201 |
| 2003/0014418 A1 | 1/2003 | Adler et al. | |
| 2003/0014654 A1 | 1/2003 | Adler et al. | |
| 2003/0088520 A1 * | 5/2003 | Bohrer et al. | 705/74 |
| 2003/0115204 A1 | 6/2003 | Greenblatt et al. | |

(Continued)

FOREIGN PATENT DOCUMENTS

WO     WO 2004/077203 A2     9/2004
WO     WO 2004080550 A2 *   9/2004

OTHER PUBLICATIONS

Wood et al., "Database Security: Requirements, Policies, and Models," IBM SYST, vol. 19, No. 2, 1980, pp. 229-251.*
Turn et al., "Privacy and Security Issues in Information System," IEEE, Dec. 1976, pp. 1353-1365.*
Powers et al., "Privacy Promises, Access Control, and Privacy Management," IEEE, 2002, pp. 1-9.*
Paeger et al., "Policy Management Using Access Control Spaces," ACM, Aug. 2003, pp. 327-364.*
Agrawal, et al, "Implementing P3P Using Database Technology," Proceedings of the 19th International Conference on Data Engineering, IEEE, 2003, pp. 595-606.
Lorch, et al., "First Experiences Using XACML for Access Control in Distributed Systems," ACM Workshop on XML Security, Oct. 31, 2003, pp. 25-37.

*Primary Examiner* — Luu Pham
(74) *Attorney, Agent, or Firm* — Gibb & Riley, LLC

(57) ABSTRACT

Methods, systems and computer program products for automatically enforcing obligations in accordance with a data-handling policy are disclosed. Requests by users for accessing data stored in a data repository are intercepted. A determination is made whether any obligations apply to each data item requested in accordance with the data handling policy. The determination may relate to whether rules having associated obligations identified in the data-handling policy apply to data items requested by a user. The obligations are automatically executed at an appropriate time after access of the data. Association of a data item requested by the user with an obligation may be recorded and tracked to determine the appropriate time for executing the obligation.

27 Claims, 5 Drawing Sheets

(56) References Cited

U.S. PATENT DOCUMENTS

| | | |
|---|---|---|
| 2003/0196108 A1 | 10/2003 | Kung |
| 2004/0054918 A1* | 3/2004 | Duri et al. ............... 713/200 |
| 2004/0054919 A1 | 3/2004 | Duri et al. |
| 2004/0088579 A1 | 5/2004 | Powers et al. |
| 2004/0111643 A1* | 6/2004 | Farmer .................... 713/201 |
| 2004/0117407 A1 | 6/2004 | Kumar et al. |
| 2004/0117644 A1 | 6/2004 | Colvin |
| 2004/0117663 A1 | 6/2004 | Colvin |
| 2004/0133803 A1 | 7/2004 | Rabin et al. |
| 2004/0225645 A1* | 11/2004 | Rowney et al. ............ 707/3 |
| 2005/0125687 A1* | 6/2005 | Townsend et al. ......... 713/200 |

* cited by examiner

AUTOMATIC ENFORCEMENT OF OBLIGATIONS ACCORDING TO A DATA-HANDLING POLICY

FIELD OF THE INVENTION

The present invention relates generally to automatically enforcing obligations according to a data-handling policy and more particularly to methods, systems and computer program products for automatically enforcing obligations relating to access of private or sensitive information according to a data-handling policy.

BACKGROUND

Organizations hold large amounts of data relating to customers, employees, company accounts, products, finances and related topics. The data may be stored in various formats such as email, spreadsheets, word processor documents, relational data base records, and other structured and unstructured formats. Much of this data is private in nature or is sensitive corporate information that should only be disclosed on a "need to know" or other restricted basis. Organizations are becoming increasingly sensitive to access of private and other sensitive data and, in some cases, are attempting to ensure that privacy and sensitivity of the data is respected. This can be implemented by a privacy policy or other data handling practices that define rules relating to who may access different types of data. The rules may additionally define purposes the data may be accessed for, under what conditions the data may be accessed and mandatory performance of certain obligations based on access of certain data. Standards are presently evolving for definition of privacy rules. Some examples of such standards are Platform for Privacy Preferences (P3P) and eXtensible Access Control Markup Language (XACML).

Currently, organizations that have a privacy policy in existence are usually obliged to have some manual means of ensuring that obligations defined by the policy are enforced. However, manual methods are neither efficient nor foolproof. It would thus be advantageous to enforce such obligations automatically, in response to access of relevant data, to ensure that the privacy rules are respected and not violated.

U.S. Pat. No. 6,253,203, entitled "Privacy-enhanced databases", incorporated herein by reference was filed on Oct. 2, 1998 in the name of O'Flaherty, et al., and is assigned to NCR Corporation. This document relates to storing data control information reflecting consumer privacy parameters in a data control column of a database table. Access to data in the database is handled in accordance with the privacy parameter/s. The restriction here is that the above arrangement assumes that the data is stored in a structured format. Moreover, the above arrangement may not be applicable to existing systems that already have a large data corpus stored in a particular format.

More generally, database triggers are defined at the level of the table in a relational database system, while the data access is at the level of an individual row. Additionally, relational database triggers operate only on insert, delete or update operations and obligations frequently need to be enforced even when the data is only being read. Furthermore, methods and systems using database triggers are restricted to structured data stored in relational databases.

U.S. Patent Application Publication No. 20030014654, entitled "Using a rules model to improve handling of personally identifiable information", incorporated herein by reference was published on Jan. 16, 2003 in the name of Adler, et al., and is assigned to International Business Machines. The document relates to specification of privacy-related actions regarding access of personally identifiable information.

U.S. Patent Application Publication No. 20040117407, entitled "Resource and data administration technologies for IT non-experts", incorporated herein by reference was published on Jun. 17, 2004 in the name of Kumar, et al. The document relates to definition, deployment and execution of policies in order to manage resources such as databases and information repositories.

A need exists for improved methods, systems and computer program products for ensuring that obligations relating to a data-handling policy are automatically enforced after relevant data is accessed.

SUMMARY

An aspect of the present invention provides a method for automatically enforcing obligations in accordance with a data-handling policy. The method comprises the steps of intercepting a request by a user for accessing data stored in a data repository, determining whether any obligations apply to each data item requested by the user in accordance with the data handling policy and automatically executing the obligations at an appropriate time after access of the data.

The method may comprise the steps of identifying rules in the data-handling policy having associated obligations and determining whether the rules apply to data items requested by the user. Association of a data item requested by the user with an obligation may be recorded and tracked to determine the appropriate time for executing the obligation.

Another aspect of the present invention provides a method for automatically enforcing obligations that apply to access of data items stored in a data repository. The method comprises the steps of intercepting a request by a user for accessing data stored in the repository, executing the request on the content of the data repository, determining whether access of each data item returned in response to the executed request is governed by a rule having an associated obligation, associating the data items governed by rules with respective ones of the obligations, automatically tracking data items and associated obligation pairs to determine appropriate times when the obligations are to be executed and automatically executing the obligations at the appropriate times.

Other aspects of the present invention comprise systems and computer program products for practicing the above methods. The methods may be performed without modification to the data schema of the data repository.

BRIEF DESCRIPTION OF THE DRAWINGS

A small number of embodiments are described hereinafter, by way of example only, with reference to the accompanying drawings in which.

DETAILED DESCRIPTION

Embodiments of the present invention provide methods, systems and computer program products for ensuring that obligations relating to a data-handling policy are automatically enforced after relevant data is accessed. The obligations are typically associated with privacy rules, which may be associated with access of specific data items. Different privacy rules may define different obligations, certain of which may be related to a specific data item.

Some examples of such obligations include "Delete the specified data 6 months after the data is accessed by a user in a particular category" and "Notify a particular user or category of users when specified data is accessed by any user". The former obligation is associated with the data item, whereas the latter obligation is associated with a specific privacy rule that fires on access of specific data items.

Figure 1:
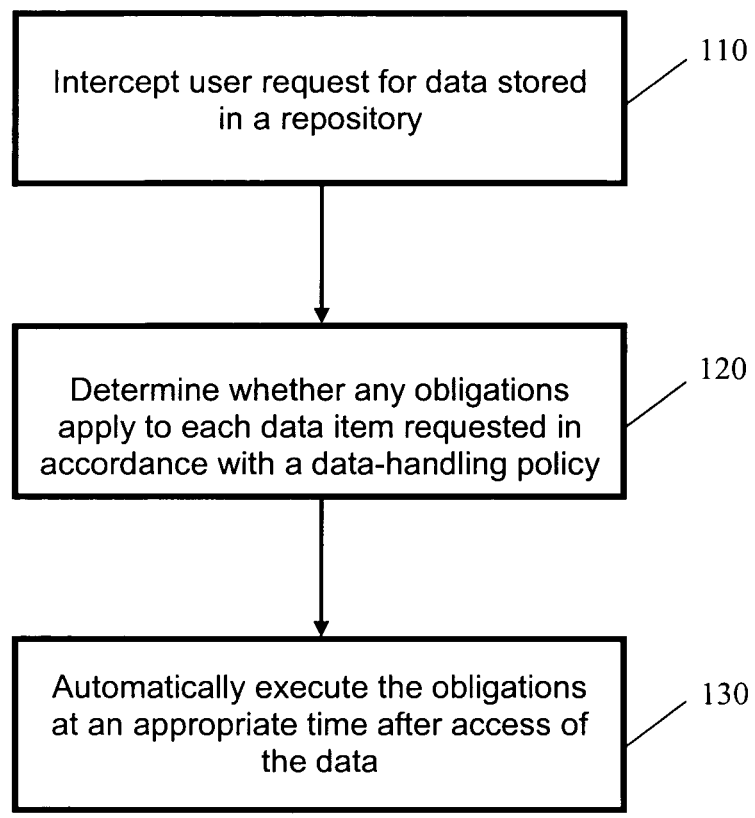
FIG. 1 is a flow diagram of a method for automatically enforcing obligations in accordance with a data-handling policy.

FIG. 1 is a flow diagram of a method for automatically enforcing obligations in accordance with a data-handling policy.

Referring to FIG. 1, a request by a user for accessing data stored in the repository is intercepted at step 110. At step 120, a determination is made whether any obligations apply to each data item requested by the user in accordance with a data-handling policy. Such obligations are automatically executed at an appropriate time after access of the data at step 130.

In certain embodiments, rules having associated obligations are identified in a data-handling policy. A determination is then made whether any such rules apply to data items requested by a user.

In one embodiment, a list of data access events is generated based on rules determined from a data-handling policy for associating data items requested by a user with an obligation. The list may, for example, comprise categories of data items, categories of users and/or user requests.

A data item and an obligation that applies to access of the data item may be associated by recording the association or marking the data item. The recorded or marked data items may then be tracked to determine an appropriate time for executing the obligation. This may be performed automatically using various record-management programs that enable declaration of data items as records to perform the necessary record keeping. Alternately, a background job may be defined for each data item with an associated obligation, where the background job executes based on the obligation defined.

The requested data may be provided to the user if the user's authority is successfully validated in accordance with the data-handling policy.

The method described above in relation to FIG. 1 may be performed without any modification to the data or schema of the data repository.

Figure 2:
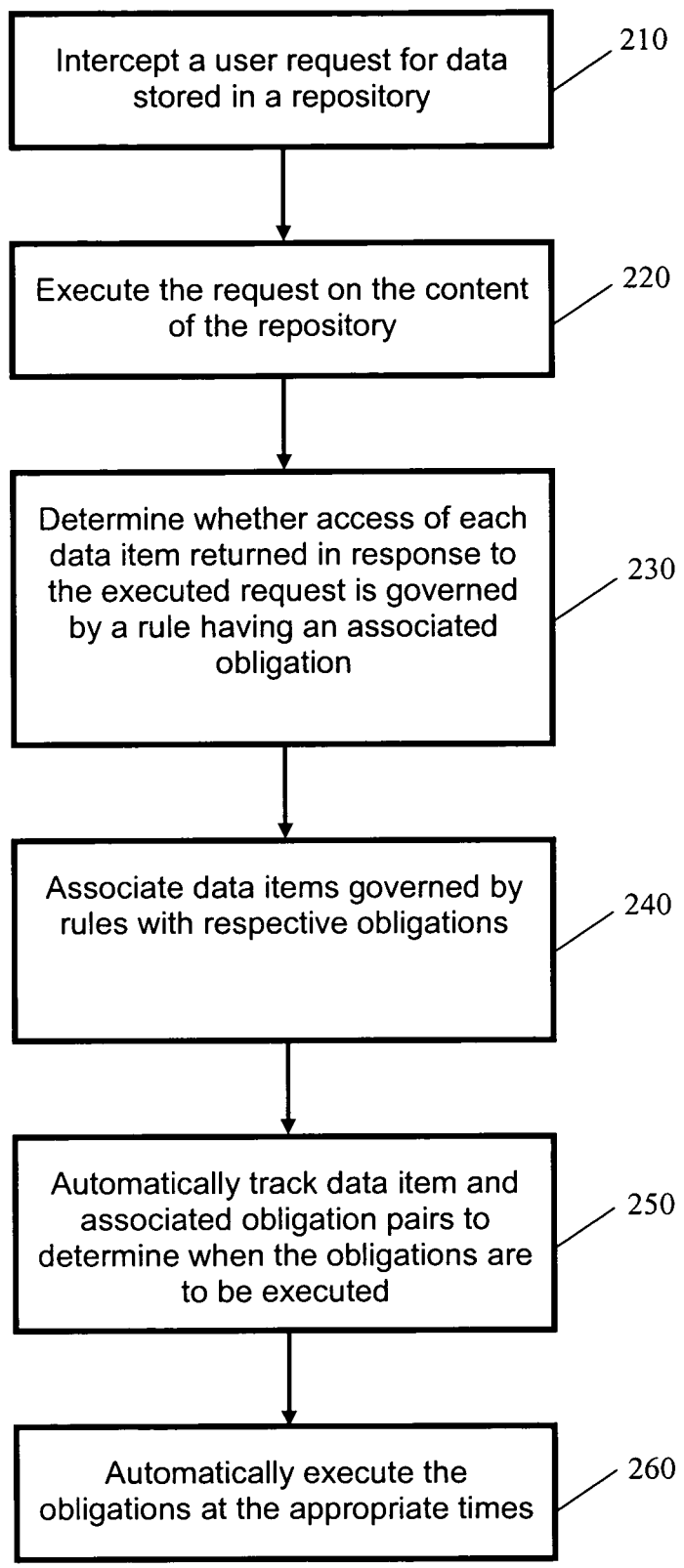
FIG. 2 is a flow diagram of a method for automatically enforcing obligations that apply to access of data items stored in a data repository.

FIG. 2 is a flow diagram of a method for automatically enforcing obligations that apply to access of data items stored in a data repository.

Referring to FIG. 2, a request by a user for accessing data stored in the repository is intercepted at step 210. The request is executed on the content of the data repository at step 220. At step 230, a determination is made whether access of each data item returned in response to the executed request is governed by a privacy rule having an associated obligation. Data items governed by a privacy rule are associated with respective obligations at step 240. The association may, for example, be performed by recordal thereof or marking of the data items.

"Marking", in the context of the present specification, is intended to include within its scope a means of noting, against a data item, that an obligation is associated with that data item. For example, an attribute "Marked" may be associated with each data item. The attribute may be initialized to "No" and set to "Yes" upon marking. At step 250, data item and associated obligation pairs are automatically tracked to determine when the obligations should be executed. The obligations are automatically executed at appropriate times at step 260.

In one embodiment, a list of data access events is generated based on rules determined from a data-handling policy for associating data items requested by a user with an obligation. The list may, for example, comprise categories of data items, categories of users and/or user requests.

The requested data may be provided to the user if the user's authority is successfully validated.

The method described above in relation to FIG. 2 may be performed without any modification to the data or schema of the data repository.

Embodiment Using IBM DB2 Content Manager and Records Manager

Figure 3:
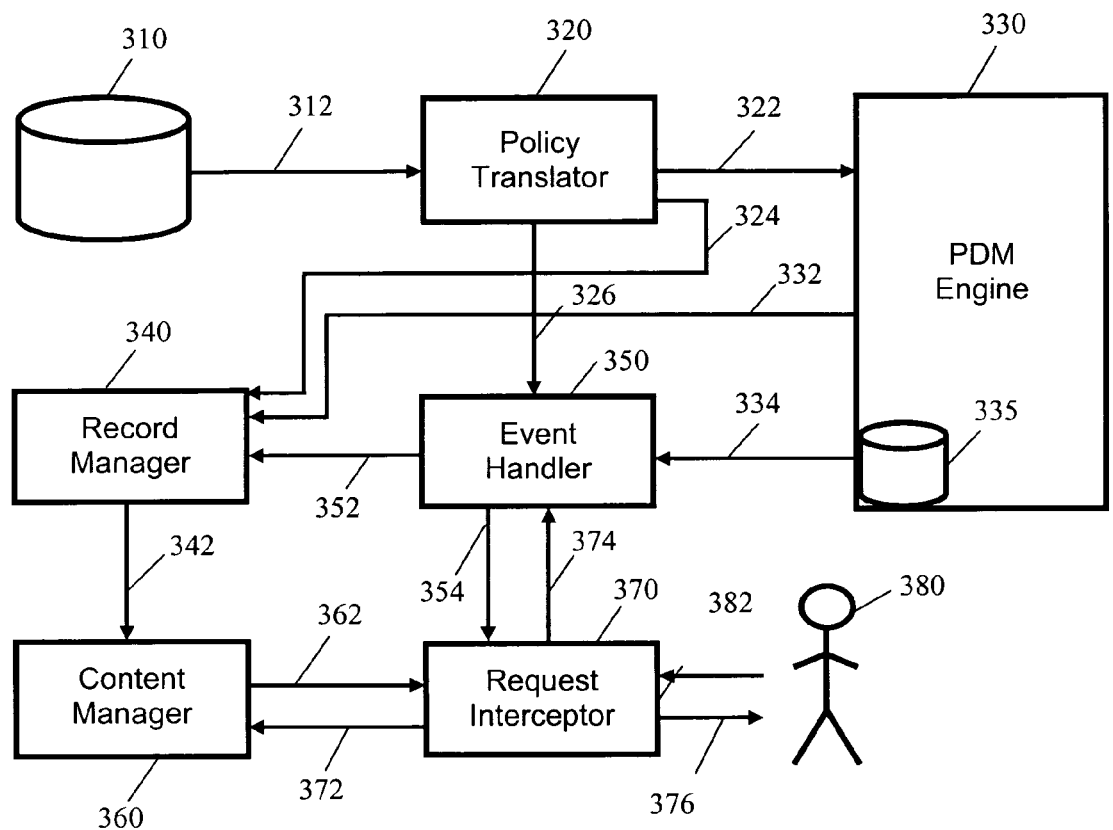
FIG. 3 is a block diagram of a system for automatically enforcing obligations that apply to access of data items stored in a data repository in accordance with a data-handling policy.

FIG. 3 is a block diagram of a system for automatically enforcing obligations that apply to access of data items stored in a data repository in accordance with a data-handling policy.

In this embodiment, the rules for accessing the data are specified in a policy language whose rules are defined based on user categories, data categories, the purpose for which the information is being accessed and an intended action. The rules may additionally mandate some obligation to be enforced, after the data is accessed. This format allows the specification of fine-grained enterprise privacy policies and concentrates on the core privacy authorization while abstracting from all deployment details such as data model or user-authentication.

Furthermore, the data is stored and managed using IBM's DB2 Content Manager, which is one of the products under the DB2 family of products, for content management. The enforcement of obligations is done using Records Manager. Records Manager provides an engine that can be integrated with various content management products, to manage the lifecycle of enterprise documents, including retention-related activities. Records Manager is integrated with Content Manager to enable control of documents in Content Manager, using Records Manager.

Referring to FIG. 3, Content Manager 360 provides a means for storing, accessing and querying various kinds of documents and digital media. Record keeping functions are performed by Records Manager 340. Records Manager 340 associates each stored document with a specific file plan component that defines transition of the document from one stage to the next in the document's life cycle. Records Manager 340 is additionally used to enforce obligations in this embodiment. Furthermore, the specific tasks performed by the Records Manager 340 in the context of enforcing obligations may alternatively be performed by batch or background jobs in the system, which are set to execute at specified times. The batch or background jobs invoke relevant Content Manager Application Program Interfaces (API's) to execute the data-item related obligations.

It should be noted that, while IBM's DB2 Content Manager 360 and Records Manager 340 are used in the present embodiment, the present invention may be practiced using other data or content management systems that provide a programmatic interface for accessing the data or content.

The database 310 stores a privacy policy specified in a pre-determined format.

The Policy Translator 320 generates data classification rules based on a privacy policy stored in the database 310. More specifically, the Policy Translator 320 generates a list of rules, obligations and events, and a mapping of certain obligations to certain events. The Policy Translator 320 also generates different groups of users or user categories and different groups of data items or data categories, as defined in the policy. A data category may be associated with a specific obligation. However, this may not always be the case as data categories may map to different obligations depending on factors such as a particular user, the purpose of access, etc. In the latter case, some conflict resolution may need to be performed for unambiguously mapping the data categories to the obligations and hence the file plans. Based on the data categories identified, the Policy Translator 320 identifies the different file plan components that have to be created in the Record Manager 340. A file plan component is a classification of a record in the Record Manager 340, under a specific category.

The Privacy Data Management Engine 330 performs environmental or background tasks such as maintaining the lists of users (and categories) and data items (and categories). The Privacy Data Management Engine 330 may perform conflict resolution for mapping of data categories to unique obligations, where necessary. The Privacy Data Management Engine 330 also designs the file plan components 335.

The Request Interceptor 370 monitors requests for data access by users and determines whether any rules and/or obligations apply to the particular data being accessed. The Request Interceptor 370 obtains the data item/s requested by a user and, for each data item, checks with the Event Handler 350 whether access by the user is allowable.

The Event Handler 350 maintains information on obligation/s and ruling/s relating to events that are generated by the Policy Translator 320. When the Event Handler 350 receives details (e.g., data fields) from the Request Interceptor 370 relating to a user request intercepted by the Request Interceptor 370, the Event Handler 350 determines whether any obligations need to be performed. If so, the Event Handler 350 marks the relevant data item as a record in the Record Manager 340, along with the predefined file plan component.

In this embodiment, the data used by the various components (e.g., the Event Handler 350, the Request Interceptor 370, the Policy Translator 320 and the PDM Engine 330) may be stored in a common database 310, or alternatively, in a number of individual databases.

Referring to FIG. 3, steps or data flows 312, 322, 324 and 326 relate to activities that are performed when the system is initialized for automatically enforcing obligations associated with a data-handling policy.

At step 312, privacy policy information is retrieved from the database 310 and parsed by the Policy Translator 320.

At step 324, classification rules generated by the Policy Translator 320 in accordance with the information retrieved in step 312 are communicated to the Record Manager 340 for registration. The classification rules may be generated by identifying the various data categories defined in the policy information, identifying obligations associated with the identified data categories and generating corresponding classifications and retention rules. The classifications are referred to as file plan components in keeping with standard terminology relating to the DB2 Record Manager 340.

The various data and user categories are communicated to the Privacy Data Management Engine 330 by the Policy Translator 320 at step 322 for mapping of specific users to the different data categories. Category maps containing information regarding which users belong to which user categories, and which data belongs to which data categories, are communicated to the Event Handler 350 at step 334. Such category maps may be provided by the application or, alternatively, by the administrator.

At step 326, the Policy Translator 320 communicates a list of events and corresponding obligations to the Event Handler 350, which are stored in a database.

Steps or data flows 352, 354, 362, 372, 374, 376 and 382 relate to run-time activities of the system for automatically enforcing obligations associated with a data-handling policy.

At step 382, a user 380 requests data from the repository via the request interceptor 370. Such a request typically comprises specification of the data requested, the purpose of the request and the intended action. If not already logged in to the system, the user 380 may be required to specify a username and password.

At step 372, the Request Interceptor 370 determines from the content repository access function of the Content Manager 360 whether the request is allowable for the particular user 380. If allowable, the request is executed and the results are communicated back to the Request Interceptor 370, at step 362. If not allowable, denial is communicated back to the Request Interceptor 370, also at step 362.

At step 374, for each data item in a set of results, the Request Interceptor 370 communicates the data item along with the user's name, intended actions and purpose to the Event Handler 350.

The Event Handler 350 determines whether the request for each particular data item is allowable based on the list of events provided by the Policy Translator 320 in step 326 and communicates the result (allowed or denied) to the Request Interceptor 370 at step 354. If the request is allowed, the Event Handler 350 also marks or records the data item for classification by the Record Manager 340, at step 352. Marking or recording of a data item in step 352 provides an indication to the Records Manager 340 that that an obligation is scheduled for execution.

At step 376, the results are provided to the user 380.

Portions of a sample policy file relating to a data-handling policy, which comprise a set of rules and some related obligations, are reproduced in Tables 1 and 2, hereinafter.

TABLE 1

```
<?xml version="1.0" encoding="UTF-8"?>
<policy-vocabulary>
    <vocabulary-information id="Medical">
    <short-description>Sample Policy designed for clinical records</short-description>
    <long-description>This is a sample privacy policy prepared for the privacy data
    management project. This is based in parts on the use case scenario, "Clinical
    Record Use" Cases available at the XACML site (Ref: http://www.oasis-
    open.org/committees/rights/documents/subcommittee/requirements/collected/XACML-
    TC/xacml-req.zip - downloaded on 30-Sep-2004)
        </long-description>
```

TABLE 1-continued

```
<issuer>
    <name>Medical Officer</name>
    <organization>Health Care</organization>
    <e-mail>xxx@in.ibm.com</e-mail>
    <address> ~~~ the address ~~~</address>
    <country>India</country>
</issuer>
<version-info start-date="2004-09-30T00:00:00" revision-number="1" last-
modified="2004-09-30T00:00:00"/>
</vocabulary-information>
<user-category id="Doctor">
<short-description>This could be the primary doctor or any other
doctor.</short-description>
</user-category>
<user-category id="MedicalAssistant">
<short-description>This includes nurses and other healthcare providers who are not
doctors.</short-description>
</user-category>
<user-category id="Patient">
    <short-description>Patient</short-description>
</user-category>
<user-category id="Institution">
    <short-description>Institution</short-description>
<long-description>This is any user who wishes to access information on behalf of an
organization commercial/non-commercial.<long-description>
</user-category>
<user-category id="Administrator">
<short-description>Administrator in the health care services</short-description>
</user-category>
<user-category id="Payer">
<short-description>Payer in the healthcare insurance</short-description>
<user-category>
<user-category id="Any"/>
<data-category id="FinancialInfo">
<short-description>Information related to any payments/billing/other financial
transactions wrt healthcare of the patient</short-description>
</data-category>
<data-category id="AdminInfo">
<short-description>Information on healthcare services received/to be received by the
person, that is non-medical.</short-description>
</data-category>
<data-category id="MedicalInfo">
<short-description>Personal medical information of the patient.</short-description>
</data-category>
<data-category id="PersonalNonMedical">
<short-description>Personal information that is of a non-medical nature, such as
phone number, address etc</short-description>
</data-category>
<data-category id="Any">
    <short-description>Any data category</short-description>
</data-category>
<purpose id="Review">
    <short-description>Read</short-description>
</purpose>
<purpose id="Any">
    <short-description>Any Purpose</short-description>
<long-description>Place holder for clauses that allow accesses to happen without
mentioning any specific purpose</long-description>
</purpose>
<purpose id="Transmission">
    <short-description>Share with others</short-description>
</purpose>
<purpose id="EmergencyAccess">
<short-description>Access in the case of an emergency</short-description>
</purpose>
<purpose id="LegalPurpose">
<short-description>Access on some legal or statutory grounds.</short-description>
</purpose>
<purpose id="Research">
    <short-description>Access for research</short-description>
</purpose>
<purpose id="Transfer">
<short-description>Access the data items for purpose of transferring elsewhere (as
opposed to transmit)</short-description>
</purpose>
<purpose id="Billing">
<short-description>Access to prepare bill for the patient.</short-description>
</purpose>
```

TABLE 1-continued

```
<purpose id="Advertising">
<short-description>Publish the patient data for advertisement/marketing.</short-description>
    </purpose>
    <action id="Retrieve"/>
    <action id="Modify"/>
<policy-vocabulary/>
```

Table 1 contains a portion of an XML data file that specifies the vocabulary used to specify the rules in Table 2, hereinafter. Referring to Table 1, user catergories in the data-handling policy are defined as 'Doctor', 'MedicalAssistant', 'Patient', 'Institution', 'Administrator', 'Payer' and 'Any'. Data categories in the policy are defined as 'FinancialInfo', 'AdminInfo', 'MedicalInfo' and 'PersonalNonMedical'. Actions in the policy are defined as 'Retrieve' and 'Modify', and possible purposes for the actions are defined as 'Review', 'Any', 'Transmission', 'EmergencyAccess', 'LegalPurpose', 'Research', 'Transfer', 'Billing' and 'Advertising'.

TABLE 2

```
<?xml version="1.0" encoding="UTF-8"?>
<sample-policy>
    <policy-information id="MedicalRules">
    <version-info start-date="2004-09-30T00:00:00" revision-number="" last-modified="2004-09-30T00:00:00"/>
    <description>This policy represents medical privacy rules which protects the privacy of patient medical information and personal information.
    </description>.
    </policy-information>
    <epal-vocabulary-ref id="Medical" location=""/>
        <condition id="SecondaryDoctor">
    <short-description>If the doctor is not the primary doctor for that patient.
    </short-description>
        </condition>
        <condition id="PrimaryDoctor">
    <short-description>If the doctor is the primary doctor for that patient.
    </short-description>
        </condition>
        <condition id="Consent">
    <short-description>If patient has given the consent.</short-description>
        </condition>
    <rule id="ObligationTransferAdminInformation" ruling="allow">
    <short-description>Obligation To Dispose when admin information is transfered.</short-description>
            <user-category refid="Administrator"/>
            <data-category refid="AdminInfo"/>
            <purpose refid="Transfer"/>
            <action refid="Retrieve"/>
            <obligation refid="Disposal">
        <parameter refid="Months"> <value>1</value>
    </parameter>
            </obligation>
        </rule>
    <rule id="ObligationTransferPersonalInformation" ruling="allow">
    <short-description>Obligation To Dispose when Personal Information is transfered</short-description>
            <user-category refid="Administrator"/>
            <data-category refid="PersonalNonMedical"/>
            <purpose refid="Transfer"/>
            <action refid="Retrieve"/>
            <obligation refid="Disposal">
        <parameter refid="Months"> <value>6</value> </parameter>
            </obligation>
        </rule>
<rule id="ObligationTransferBillingInformation" ruling="allow">
        <short-description>Obligation To Dispose when Billing Information is transfered</short-description>
            <user-category refid="Administrator"/>
            <data-category refid="FinancialInfo"/>
            <purpose refid="Billing"/>
            <action refid="Retrieve"/>
            <obligation refid="Disposal">
```

TABLE 2-continued

```
        <parameter refid="Months"> <value>6</value> </parameter>
            </obligation>
        </rule>
    <rule>~~~</rule>
    <rule>~~~</rule>
    <rule>~~~</rule>
</sample-policy>
```

Table 2 contains a portion of an XML data file that specifies conditions and rules relating to a data-handling policy in accordance with the vocabulary specified in Table 1. Referring to Table 2, rules in the policy are defined as 'ObligationTransferAdminInformation', 'ObligationTransferPersonalInformation' and 'ObligationTransferBillingInformation'. For example, the first rule states that when a user belonging to the user category 'Administrator' retrieves information that belongs to the category 'AdminInfo', for the purpose of transfer of the information, then the rule allows such data access with the obligation that the information is deleted after 1 month.

Figure 4:
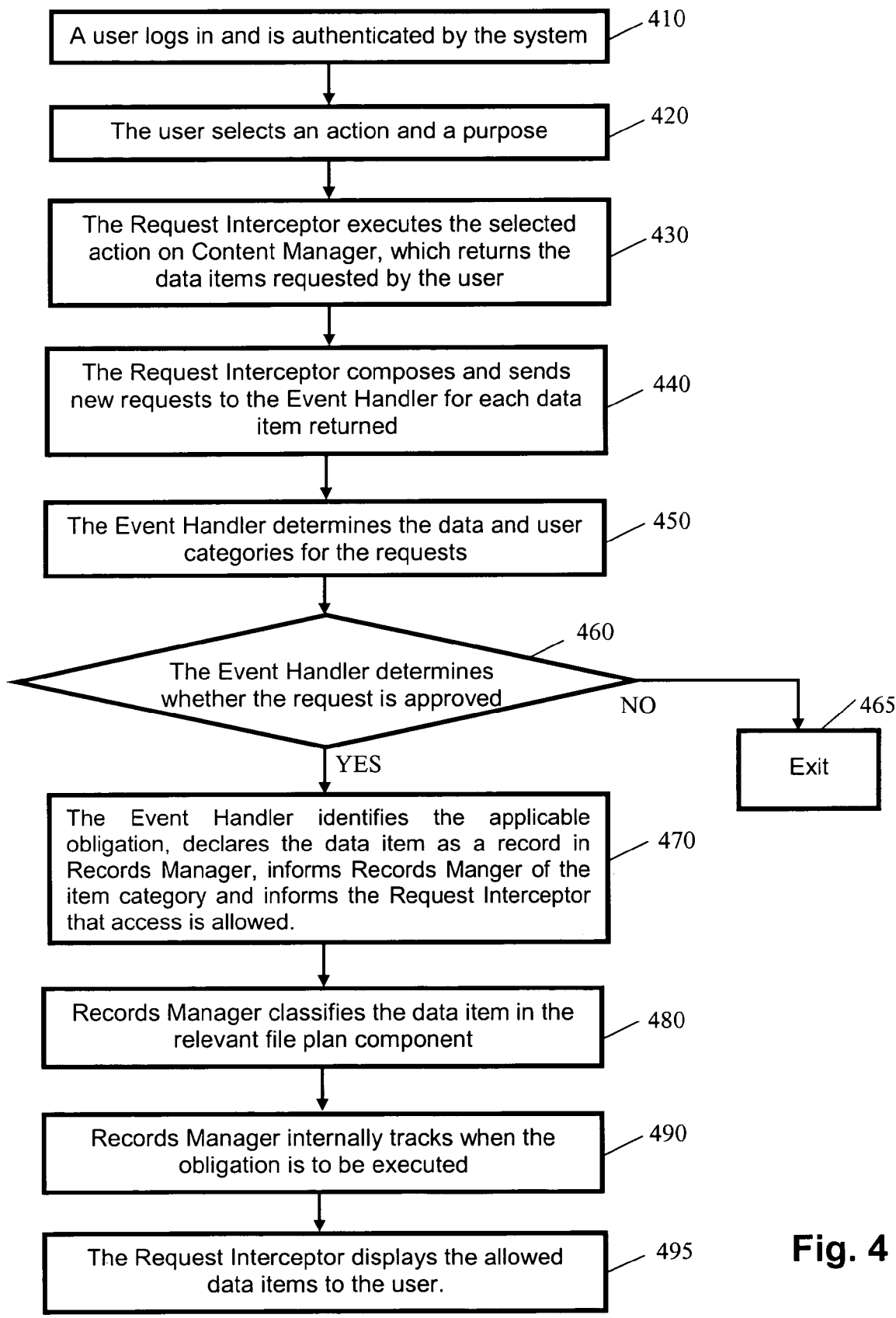
FIG. 4 is a flow diagram showing an example of a data retrieval process using the system of FIG. 3.

FIG. 4 is a flow diagram showing an example of a data retrieval process using the system of FIG. 3. Accordingly, items having like reference numerals in FIGS. 3 and 4 are intended to refer to the same items or items providing similar functionality.

A user 380 of type 'administrator' logs in, specifying a user name and password, and is authenticated by the system at step 410.

At step 420, the user 380 selects an action and a purpose. For example, the user 380 may select 'Retrieve' for an action, and 'Transfer' for a purpose. A sample query that the user might enter, in Content Manager syntax, is: \PatientRecord[@PatientFName="Alice"]. This query is interpreted by Content Manager 360 as a request to select all data items of type 'PatientRecord', where the patient's first name is 'Alice' (In the sample scenario defined by the information in Tables 1 and 2, hereinbefore, each patient has 4 records associated with him or her, which pertain to the 4 data categories, viz., medical information, financial information, admin information, and personal information that is non-medical in nature).

At step 430, the Request Interceptor 370 executes the selected action or query on Content Manager 360 using a Content Manager Application Program Interface (API), which returns a result set comprising 4 data items. Of these, one item belongs to the data category 'AdminInfo'.

For each of the data items retrieved, the Request Interceptor 370 composes a new request that is sent to the Event Handler 350, at step 440. Such new requests comprise the data item, user name, purpose and intended action.

When the Event Handler 350 receives a request from the Request Interceptor 370, the Event Handler 350 determines the data category and the user category of the current data item and user name, respectively, at step 450.

The Event Handler 350 then determines whether the associated ruling is affirmative (i.e., that the user's request is approved) at step 460. If so (YES), the Event Handler 350 identifies an applicable obligation, declares the data item as a record in Records Manager 340, informs Records Manager 340 of the relevant item category and informs the Request Interceptor 370 that access of the data items requested by the user is allowed, at step 470. If the Event Handler 350 receives a request from a user of type 'Administrator' to access a data item of type 'AdminInfo' for an action to 'Retrieve' with a purpose to 'Transfer', based on the first rule in the sample XML file shown in Table 2 hereinbefore, the Event Handler 350 determines that an obligation is to be executed, viz., that the data item is to be deleted after a period of 1 month. The process of FIG. 4 continues at step 480 unless the associated ruling is negative (NO, that is the user's request is not approved) at step 460, whereupon the process of FIG. 4 is terminated at step 465.

At step 480, Records Manager 340 classifies the data item in the relevant file plan component (as determined at setup time), which is equivalent to marking the item for obligation enforcement.

At step 490, Records Manager 340 internally tracks when the obligation is to be executed based on the data item of type 'AdminInfo'.

At step 495, the Request Interceptor 370 displays the allowed data items to the user 380.

In the example described herein with reference to FIG. 4, the information maintained comprises (but is not limited to):
  i) USER_CATEGORIES—maintains the list of user categories.
  ii) DATA_CATEGORIES—maintains the list of data categories.
  iii) USER_TO_CATEGORY_MAP—associates each specific user to a user category.
  iv) DATA_TO_CATEGORY_MAP—associates each specific data item to a data category.
  v) ACTIONS—maintains the list of actions supported by the policy.
  vi) PURPOSES—maintains the list of purposes supported by the policy.
  vii) RULES—maintains the rules in the privacy policy.
  viii) OBLIGATIONS—maintains details of the various obligations invoked by the privacy policy.
  ix) EVENTS—maintains the list of events derived from the various rules in the policy and, for each event, whether the event mandates an obligation and, if yes, the obligation identification.

In the example described herein with reference to FIG. 4, the data items are tracked by Records Manager 340 and explicit marking of the data items is unnecessary. Other functionality is handled internally by Content Manager 360 and Records Manager 340.

In the more general case, however, when obligations are required to be enforced without the use of Records Manager 340 (and possibly the other DB2 components and capability), a system of marking the data items having applicable obligations, is necessary. This may be implemented, for example, by maintaining a table, ITEM-OBLIGATION, which has a data item identification field and an obligation identification field. Whenever an obligation is mandated on a data item, an entry is made in this table with the relevant identification information. Data items present in the table are marked for obligation enforcement.

Figure 5:
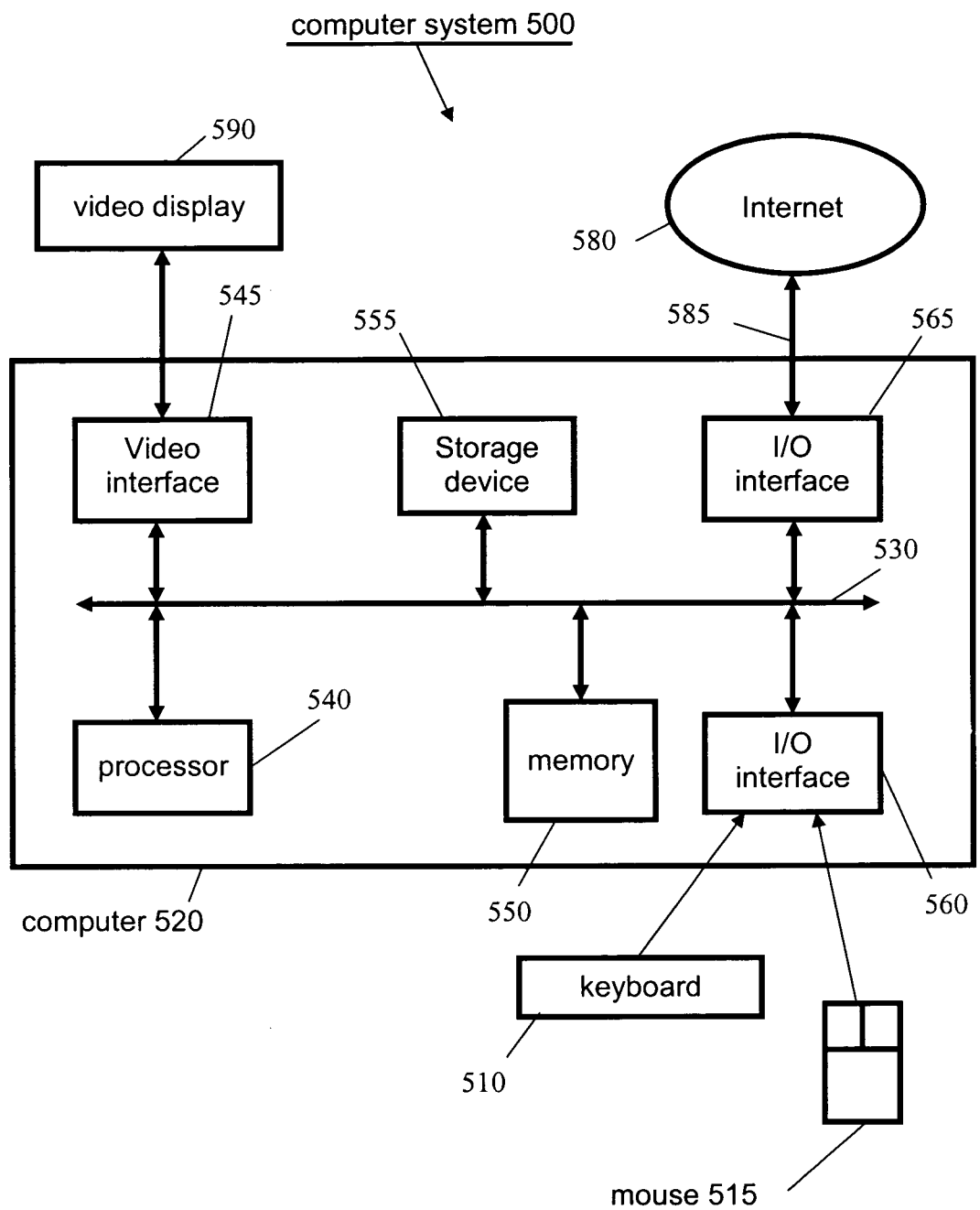
FIG. 5 is a schematic representation of a computer system with which embodiments of the present invention may be practiced.

FIG. 5 is a schematic representation of a computer system 500 that can be used to practice the methods described herein. Specifically, the computer system 500 is provided for executing computer software that is programmed to assist in performing a method for automatically enforcing obligations in accordance with a data-handling policy. The computer software executes under an operating system such as MS Windows XP™ or Linux™ installed on the computer system 500.

The computer software involves a set of programmed logic instructions that may be executed by the computer system 500 for instructing the computer system 500 to perform predetermined functions specified by those instructions. The computer software may be expressed or recorded in any language, code or notation that comprises a set of instructions intended to cause a compatible information processing system to perform particular functions, either directly or after conversion to another language, code or notation.

The computer software program comprises statements in a computer language. The computer program may be processed using a compiler into a binary format suitable for execution by the operating system. The computer program is programmed in a manner that involves various software components, or code means, that perform particular steps of the methods described hereinbefore.

The components of the computer system 500 comprise: a computer 520, input devices 510, 515 and a video display 590. The computer 520 comprises: a processing unit 540, a memory unit 550, an input/output (I/O) interface 560, a communications interface 565, a video interface 545, and a storage device 555. The computer 520 may comprise more than one of any of the foregoing units, interfaces, and devices.

The processing unit 540 may comprise one or more processors that execute the operating system and the computer software executing under the operating system. The memory unit 550 may comprise random access memory (RAM), read-only memory (ROM), flash memory and/or any other type of memory known in the art for use under direction of the processing unit 540.

The video interface 545 is connected to the video display 590 and provides video signals for display on the video display 590. User input to operate the computer 520 is provided via the input devices 510 and 515, comprising a keyboard and a mouse, respectively. The storage device 555 may comprise a disk drive or any other suitable non-volatile storage medium.

Each of the components of the computer 520 is connected to a bus 530 that comprises data, address, and control buses, to allow the components to communicate with each other via the bus 530.

The computer system 500 may be connected to one or more other similar computers via the communications interface 565 using a communication channel 585 to a network 580, represented as the Internet.

The computer software program may be provided as a computer program product, and recorded on a portable storage medium. In this case, the computer software program is accessible by the computer system 500 from the storage device 555. Alternatively, the computer software may be accessible directly from the network 580 by the computer 520. In either case, a user can interact with the computer system 500 using the keyboard 510 and mouse 515 to operate the programmed computer software executing on the computer 520.

The computer system 500 has been described for illustrative purposes. Accordingly, the foregoing description relates to an example of a particular type of computer system suitable for practicing the methods and computer program products described hereinbefore. Other configurations or types of computer systems can be equally well used to practice the methods and computer program products described hereinbefore, as would be readily understood by persons skilled in the art.

Methods, apparatus and computer program products have been described hereinbefore for automatically enforcing obligations in accordance with a data-handling policy. Advantageously, the methods, apparatus and computer program products described do not make any assumptions on how the underlying data is stored or accessed. The data may be stored in a data repository in a structured or unstructured format, with users able to retrieve the content, one or more data items at a time.

Still further, advantageously, an existing data repository need not be modified in any manner. More specifically, no modification to the data itself or the schema is required.

Modification of the data-handling or privacy policy by addition or deletion of rules or modification of existing rules may be performed by re-executing the policy translator.

The foregoing detailed description provides exemplary embodiments only, and is not intended to limit the scope, applicability or configurations of the invention. Rather, the description of the exemplary embodiments provides those skilled in the art with enabling descriptions for implementing an embodiment of the invention. Various changes may be made in the function and arrangement of elements without departing from the spirit and scope of the invention as set forth in the claims hereinafter.

Where specific features, elements and steps referred to herein have known equivalents in the art to which the invention relates, such known equivalents are deemed to be incorporated herein as if individually set forth.

The invention may be said to broadly comprise features, elements and steps referred to or described herein, individually or collectively, and in any or all of two or more of the features, elements and steps. Specifically, features, elements and steps referred to in respect of particular embodiments may optionally and selectively be included in any other embodiments.

We claim:

1. A method for automatically enforcing obligations in accordance with a data-handling policy, said data-handling policy comprising rules for access to data stored in a data repository and obligations based on said access to said data, said method comprising:
   intercepting a request by a user for accessing said data stored in said data repository;
   determining user access restrictions to said data according to said rules;
   providing requested data to said user upon successfully validating said user according to said rules;
   identifying an obligation associated with access to a specific data item, said obligation comprising a specified action invoked by said data-handling policy as a result of said access to said specific data item, and said obligation being associated with an appropriate time for execution;
   identifying rules in said data-handling policy having said obligation;
   generating a list of data access events, based on said rules, for associating the specific data item requested by said user with said obligation; and
   responsive to said requested data comprising said specific data item, automatically executing said obligation at said appropriate time after access to said specific data item requested by said user.

2. The method of claim 1, said identifying comprising: associating a rule in said data-handling policy with said obligation.

3. The method of claim 2, said identifying further comprising:
   recording said specific data item requested by said user being associated with said obligation; and
   tracking said specific data item and said obligation to determine said appropriate time for executing said obligation.

4. The method of claim 1, said list of data access events comprising any of:
   data item categories;
   user categories; and
   user requests.

5. The method of claim 1, further comprising:
   tracking said specific data item and said obligation that is associated with said specific data item to determine said appropriate time for executing said obligation.

6. The method of claim 1, wherein a data schema of said data repository remains unmodified.

7. A method for automatically enforcing obligations that apply to access of data items stored in a data repository, said method comprising:
   intercepting a request by a user for accessing data stored in said data repository;
   executing said request on said data repository;
   determining whether access to a data item returned in response to said request is governed by rules of a data-handling policy;
   providing requested data to said user upon successfully validating said user according to said rules;
   determining whether an obligation is associated with said data item returned in response to said request, said obligation comprising a specified action invoked by said rules of said data handling policy as a result of said access to a specific data item;
   responsive to said requested data comprising said specific data item, automatically tracking said specific data item and said obligation to determine an appropriate time for said obligation to be executed;
   identifying rules in said data-handling policy having said obligation;
   generating a list of data access events, based on said rules, for associating the specific data item requested by said user with said obligation; and
   automatically executing said obligation at said appropriate time.

8. The method of claim 7, wherein a data schema of said data repository remains unmodified.

9. The method of claim 7, said automatically tracking said specific data item further comprising:
   recording said obligation associated with said specific data item returned in response to said request.

10. A system for automatically enforcing obligations in accordance with a data handling policy, said data handling policy comprising rules for access to data stored in a data repository and obligations based on said access to said data, said system comprising:
    a processor operatively connected to said data repository;
    a user interface operatively connected to said processor, said user interface receiving a request for accessing said data stored in said repository; and
    an output device operatively connected to said processor, said processor comprising:
      a content manager;
      a request interceptor that intercepts said request for accessing said data stored in said repository and executes said request on said content manager, which returns requested data to said output device according to said request;

an event handler that determines whether said request is approved according to said rules and determines if an obligation is associated with access to a specific data item returned in response to said request in accordance with said data handling policy, said obligation comprising a specified action invoked by said data-handling policy as a result of said access to said specific data item, and said obligation being associated with an appropriate time for execution; and a policy translator that identifies rules in said data handling policy having said obligation and generates a list of data access events, based on said rules, for associating the specific data item requested by said user with said obligation; and responsive to said requested data comprising said specific data item, said processor executing said obligation at said appropriate time after access of said specific data item.

11. The system of claim 10, said event handler recording that said specific data item requested is associated with said obligation.

12. The system of claim 10, wherein said list of data access events comprises comprising any of:
   data item categories; and
   user categories.

13. The system of claim 10, said processor further comprising:
   a privacy data management engine that maintains a list of users and data items and performs conflict resolution for mapping of data categories to unique obligations.

14. The system of claim 10, wherein a data schema of said repository remains unmodified.

15. A computer system for automatically enforcing obligations that apply to data items stored in a data repository, said system comprising:
   a memory for storing data and computer instructions; and
   a processor connected to said memory, said processor executing said computer instructions to perform the tasks of:
      intercepting a request for accessing data stored in said repository;
      executing said request on said data repository;
      determining whether access to a data item returned in response to said request is governed by rules of a data-handling policy;
      identifying if an obligation is associated with said data item returned in response to said request in accordance with said data handling policy, said obligation comprising a specified action invoked by said data-handling policy as a result of said access to a specific data item, and said obligation being associated with an appropriate time for execution;
      marking said data item returned in response to said request having an obligation according to said data handling policy;
      automatically tracking said data item returned in response to said request having an associated obligation and said associated obligation to determine an appropriate time when said obligation should be executed;
      identifying rules in said data-handling policy having said obligation;
      generating a list of data access events, based on said rules, for associating said specific data item requested with said obligation; and
      automatically executing said associated obligation at said appropriate time.

16. The system of claim 15, wherein said rules comprising privacy rules.

17. The system of claim 15, wherein a data schema of said data repository remains unmodified.

18. The system of claim 15, said processor executing said computer instructions further performing:
   validating an authority of a user to access said data item; and
   providing said data item to said user upon successfully validating said user in accordance with said rules of said data handling policy.

19. A non-transitory computer readable medium, tangibly storing instructions executable by a computer to perform a method for automatically enforcing obligations in accordance with a data-handling policy, said method comprising:
   intercepting a request for accessing data stored in a data repository;
   determining user access restrictions to said data according to rules of said data-handling policy;
   providing requested data to a user upon successfully validating said user according to said rules;
   identifying an obligation associated with access to a specific data item, said obligation comprising a specified action invoked by said data-handling policy as a result of said access to said specific data item, and said obligation being associated with an appropriate time for execution;
   identifying rules in said data-handling policy having said obligation;
   generating a list of data access events, based on said rules, for associating the specific data item requested by said user with said obligation; and
   responsive to said requested data comprising said specific data item, automatically executing said obligation at said appropriate time after access to said specific data item requested by said user.

20. The non-transitory computer readable medium of claim 19, said method further comprising:
   identifying rules in said data-handling policy having associated obligations; and
   determining whether said rules apply to each data item requested by said user.

21. The non-transitory computer readable medium of claim 20, said method further comprising:
   recording said specific data item requested by said user being associated with said obligation; and
   tracking said specific data item and said obligation to determine said appropriate time for executing said obligation.

22. The non-transitory computer readable medium of claim 19, wherein said list of data access events comprising any of: data item categories; user categories; and user requests.

23. The non-transitory computer readable medium of claim 19, said method further comprising:
   validating an authority of said user to access said data; and
   providing said requested data to said user upon successfully validating said user in accordance with said rules of said data handling policy.

24. The non-transitory computer readable medium of claim 19, wherein a data schema of said data repository remains unmodified.

25. A non-transitory computer readable medium, tangibly storing instructions executable by a computer to perform a method for automatically enforcing obligations in accordance with a data-handling policy, said method comprising:
   intercepting a request for accessing data stored in a data repository;

executing said request on said data repository;

determining whether access to a data item returned in response to said request is governed by rules of said data-handling policy;

determining whether an obligation is associated with said data item returned in response to said request, said obligation comprising a specified action invoked by said rules of said data handling policy, as a result of said access to a specific data item;

identifying rules in said data-handling policy having said obligation;

generating a list of data access events, based on said rules, for associating said specific data item requested with said obligation;

responsive to said data item returned in response to said request comprising said specific data item, automatically tracking said specific data item and said obligation to determine an appropriate time for said obligation to be executed; and automatically executing said obligation at said appropriate time.

26. The non-transitory computer readable medium of claim 25, wherein a data schema of said data repository remains unmodified.

27. The non-transitory computer readable medium of claim 25, said method further comprising:

validating an authority of a user to access said data item; and providing said data item to said user upon successfully validating said user in accordance with said rules of said data handling policy.

* * * * *